United States Patent [19]
Werner et al.

[11] Patent Number: 5,349,884
[45] Date of Patent: Sep. 27, 1994

[54] DUST SHIELD MOUNTING SYSTEM

[75] Inventors: Lawrence E. Werner, Grosse Pointe; James R. Klotz, Mt. Clemens, both of Mich.

[73] Assignee: Chrysler Corporation, Highland Park, Mich.

[21] Appl. No.: 141,976

[22] Filed: Oct. 28, 1993

[51] Int. Cl.⁵ .................. F16H 57/02; F16D 1/00; F16B 39/28
[52] U.S. Cl. .................. 74/606 R; 403/408.1; 411/185
[58] Field of Search ............ 74/606 R; 403/405.1, 403/408.1, 409.1, 7, 13; 411/338, 339, 185, 186

[56] References Cited

U.S. PATENT DOCUMENTS

| | | | |
|---|---|---|---|
| 3,058,211 | 10/1962 | Axtell | 403/408.1 |
| 3,674,246 | 7/1972 | Freeman | 403/408.1 |
| 3,687,501 | 8/1972 | Wilson et al. | 403/408.1 |
| 4,310,272 | 1/1982 | Rich et al. | 411/185 |
| 4,411,552 | 10/1983 | Lanham et al. | 403/408.1 X |
| 4,597,603 | 7/1986 | Trabert | 403/408.1 X |
| 5,020,678 | 6/1991 | Klein | 403/408.1 X |
| 5,040,917 | 8/1991 | Camuffo | 411/338 X |
| 5,230,137 | 7/1993 | Abe | 403/408.1 X |
| 5,234,247 | 8/1993 | Pacer | 403/408.1 X |

FOREIGN PATENT DOCUMENTS

| | | | |
|---|---|---|---|
| 3523168 | 5/1986 | Fed. Rep. of Germany ... | 403/408.1 |
| 2-21009 | 2/1990 | Japan | 403/408.1 |

*Primary Examiner*—Vinh T. Luong
*Attorney, Agent, or Firm*—Kenneth H. MacLean

[57] ABSTRACT

A system for mounting a dust shield to a vehicle transmission's clutch/transmission housing by attachment by fasteners along only the accessable lower edge portion and by providing structure which upon assembly pivots an otherwise unsupported corner of the dust shield against a housing surface which inhibits vibration and noise generation.

3 Claims, 1 Drawing Sheet

DUST SHIELD MOUNTING SYSTEM

BACKGROUND OF THE INVENTION

1. Field of the Invention

This invention relates to apparatus for mounting only one edge portion of a relatively thin walled dust shield to an engine's clutch/torque converter housing in a manner inhibiting vibratory movements of the opposite edge portion. During assembly of the dust shield, an opening in the dust shield associated with a flexible tab is engaged by a fastener which produces slight rotation of the dust shield which in turn moves an upper edge portion of the dust shield against a wall portion of the housing to firmly engage the dust shield to inhibit vibratory movements.

Unfortunately, in a typical engine/transmission environment only the lower edge of the dust shield is accessable for attachment by fasteners to the engine/transmission housing. Thus, it is important to somehow stabalize or secure its upper edge. The subject dust shield uses two or more bolt or cap screw type fasteners located through openings positioned along the accessable lower edge of the dust shield. One of the openings for a fastener is formed partially at one side by an end edge of a cantilevered tab which is struck-out at an oblique angle from the plane of the dust shield. As this fastener is tightened, its head portion moves inward against the tab to flatten the tab which also causes a slight movement of the dust shield. Another fastener extending through a second opening acts as a pivot point or fulcrum. The resultant rotation moves an upper edge portion of the dust shield against a portion of the housing to inhibit vibratory movements of the dust shield.

2. Description of Related Art

Prior to the present invention, dust shields have been mounted to metal housings using rubber moldings to inhibit vibration. This necessitates extra parts and is expensive.

In U.S. Pat. No. 3,455,409, a cover of reenforced rubber material surrounds a transmission. Although this arrangement is for drag racing vehicles and is to hold a transmission together upon failure, it would also prevent transmission of noise.

In U.S. Pat. No. 4,191,272, an end plate between the engine and transmission is sealed by a member with a rubber lower edge.

SUMMARY OF THE INVENTION

This invention is directed to a new and improved system and apparatus for mounting only one edge portion of a relatively thin walled dust shield to a transmission's clutch/torque converter housing in a manner inhibiting vibratory movements of the opposite edge portion. During assembly of the dust shield, an opening in the dust shield associated with a flexible tab is engaged by a fastener which produces slight rotation of the dust shield which in turn moves an upper edge portion of the dust shield against a wall portion of the housing to firmly engage the dust shield to inhibit vibratory movements.

Specifically, in a typical transmission clutch/torque converter housing environment, an engine is attached to the housing and overlies an upper edge portion of a dust shield. Thus, only the dust shield's lower edge portion is accessable for attachment to the housing by fasteners. To inhibit vibration of the shield, it is important to stabalize or secure the upper edge portion of the dust shield. A preferred embodiment of the dust shield mounting system uses bolt or cap screw type fasteners extending through openings through the accessable lower edge of the dust shield. One of the openings has one side defined by the end of a cantilevered tab which is laterally struck-out at an oblique angle from the plane of the dust shield. As a fastener associated with the opening moves toward the housing, the end of the tab is forced inward tending to flatten the tab. Simultaneously, this produces a slight rotation of the dust shield about the axis of another fastener which forces an upper edge portion of the dust shield to press against a wall portion of the housing.

These and other features and advantages will become more apparent from the following:

DETAILED DESCRIPTION

Figure 1:
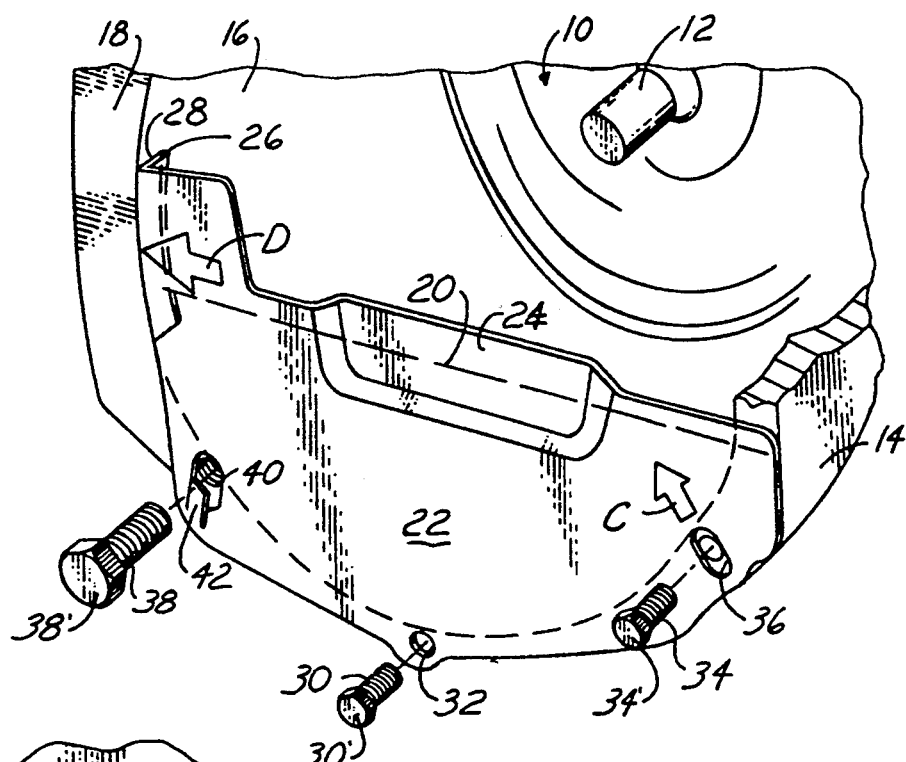
FIG. 1 is a partial perspective view of a transmission's clutch or torque converter housing showing a dust shield and fasteners used to attach the dust shield to the housing.
Figure 2:
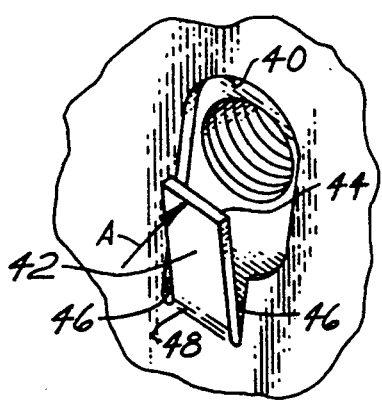
FIG. 2 is an enlarged perspective view of the leftward opening through the dust shield shown in FIG. 1.

Turning now in greater detail to the embodiment of the invention as illustrated in FIG. 1, the input end portion of a vehicle transmission 10 is shown in perspective. Visible is the end 12 of the transmission's input shaft. A generally hollow and open ended clutch or torque converter housing 14 extends from the front end of transmission 10. Housing 14 has an interior wall or surface 16. When the engine is in use, housing 14 encloses a clutch or a torque converter assembly. The usual clutch or torque converter assembly is removed to better reveal the interior of housing 14. The rear or output end portion of a vehicle engine (not shown) is adapted to mate with the end surface 18 of the housing 14.

Broken line 20 represents the lower edge of the engine when attached to surface 18 of housing 14. The end of housing 14 is typically not completely covered by the engine and thus an opening remains below line 20. Typically, a dust shield covers this opening to prevent entry of foreign material and the escape of noise. The main body of the dust shield 22 is substantially flat but with a central portion 24 offset slightly. The space created by the offset portion 24 allows room for a spring which bears against the engine's oil pan and rear seal.

Because of the positioning of the engine which overlies the upper edge portion of the dust shield, placement of fasteners near the shield's upper edge portion is not possible. This lack of attachment at the upper edge could be a source of vibration and noise. Therefore, the subject fastening system proves stability for the upper edge and particularly the upper left corner.

This application concerns a mounting system and apparatus to secure the dust shield 22 to the housing 14 by fasteners positioned along the lower edge without a need for fasteners at the upper edge which would interfer with the transmission. At an upper portion of the dust shield, a turned or bent tab 26 is formed which extends substantially normal to the plane of the dust shield. The tab 26 defines surface 28 which is intended to contact interior wall 16 of the housing to inhibit vibratory movements of this otherwise unattached portion of the dust shield 22.

The tab 26 engages and is pressed against surface 16 by a unique fastener arrangement along the lower edge of the dust shield. In FIG. 1, the lower, central portion of the dust shield 22 is attached to housing 14 by a cap screw type fastener 30 which passes through cylindrical opening 32. The lower, rightward portion of the dust shield 22 is attached to the housing 14 by another cap screw type fastener 34 which extends through elongated slot 36. After final tightening of fasteners 30 and 34, heads 30' and 34' secure the portions of the dust shield 22 encircling the openings 32 and 36.

As shown in FIG. 1, the lower, leftward portion of dust shield 22 is attached to the housing 14 by cap screw type fastener 38 which extends through an opening 40. Like the opening 36, opening 40 is slightly oversize relative to the shank of the cap screw 38. The lower side portion of the opening 40 is defined and formed by an end 44 of a flexible or movable tab 42. The tab itself is formed by striking out portions on either side of the tab to form channels 46. The tab 42 is integrally connected to the dust shield 22 by connecting hinge portion 48.

Figure 3:
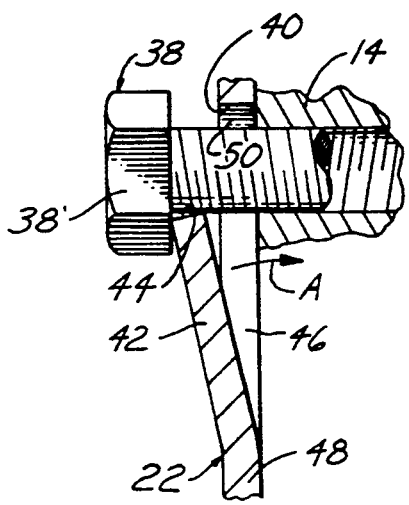
FIG. 3 and 4 are elevational side views of the opening shown in FIG. 2 in a pre-assembly condition and in a post-assembly condition.
Figure 4:
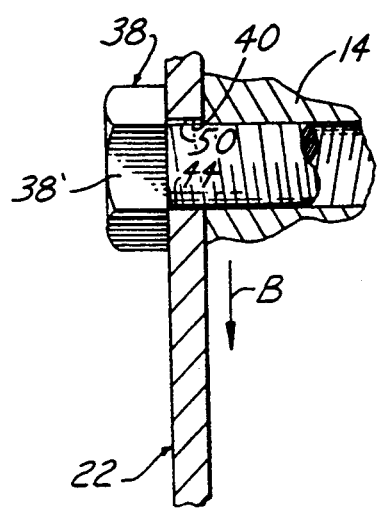

The dust shield 22 is assembled to housing 14 by insertion of fasteners 30, 34 and 38 through openings 32, 36 and 40 respectively. The fasteners 30 and 34 are tightened so that the head portions 30', 34' just touch the dust shield so that it can slide relative to the end surface of housing 14. The fastener 38 is tightened until its head 38' engages the tab 42 as shown in FIG. 3. Further tightening of fastener 38 causes head 38' to distort and return tab 42 in direction A and back into the plane of the dust shield 22 as shown in FIG. 4. As can be seen by comparing FIGS. 3 and 4, this flattening of tab 42 causes its end 44 to slide along the fastener shaft and produces a slight movement of tab 42 and the connected body portion of dust shield 22 in direction B. Note the decrease in the gap 50 from the tab's position in FIG. 3 and its position in FIG. 4.

Referring again to FIG. 1, the movement B caused by flatening movement A of tab 42 forces the dust shield 22 to rotate in a counterclockwise direction about the fastener 30 which serves as a fulcrum for the pivotal movement. At the same time, the elongated slot 36 permits corresponding movement C of the rightward portion of the dust shield. The above described rotation of dust shield 22 moves turned tab portion 26 in the direction D which presses the surface 28 against the wall 16 to inhibit vibratory movements of that portion of the dust shield.

After the fastener 38 is tightened to a desired final torque level, the other fasteners 30 and 34 are torqued to specifications. Thus, the dust shield is assembled and the upper edge portion is automatically secured against the housing.

While a preferred embodiment of the invention has been shown and described, other embodiments will now become apparent to those skilled in the art. Specifically, a dual fastener system is easily contemplated in contrast to the above described three fastener system. With a dual fastener system, the fastener 34 and slot 36 could be eliminated. A single fastener system can also be contemplated in which fasteners 30 and 34 are eliminated and other fulcrum forming means are provided. Accordingly, this invention is not to be limited to what is shown and described but by the following claims.

What is claimed is:

1. In combination: an improved assembly system for attaching a cover member to a housing (14) along only substantially one edge portion of the cover member, comprising: a generally planar cover member (22) having an opening (40) therethrough; a fastener (38) with a cylindrical body portion adapted to extend through said opening for threading into the housing (14); a tab (42) having an end surface (44) defining a portion of the side of said opening (40), said tab (42) in an unstressed preassembly condition extending obliquely from the plane of said cover member (22) causing said end surface (44) of said tab (42) to be spaced outwardly from the plane of said cover member (22) and away from the housing (14) a portion of said tab (42) opposite said end surface (44) serving as an integral hinge (48) with the remainder of said cover member (22), said tab (42) being capable of flattening movement into the plane of said cover member (22); a head portion (38') of said fastener (38) engaging said end surface (44) of the tab (42) to produce flattening distortion of said tab (42) when said fastener (38) is tightened and its head portion (38') moved toward the housing (14), thereby flattening said tab (42) into the plane of the cover (22).

2. In combination: an assembly system for rigidly attaching a dust shield to a transmission's clutch/torque converter housing (14) along only substantially one edge portion of the dust shield, comprising: a dust shield (22) having a surface (28) remote from said one edge portion and adapted to firmly contact the housing (14) to inhibit vibratory movements, said dust shield (22) having an opening (40) through said one edge portion; a fastener (38) with a cylindrical body portion adapted to extend through said opening (40) for threading into the housing (14); a tab (42) having an end surface (44) defining a portion of the side of said opening (40), said tab (42) in an unstressed pre-assembly condition extending obliquely from the plane of said dust shield (22) causing said end surface (44) of said tab (42) to be spaced outwardly from the plane of said dust shield (22) and away from the housing (14), a portion of said tab (42) opposite its end surface (44) serving as an integral hinge (48) with the remainder of said dust shield (22), said tab (42) being capable of flattening movement into the plane of said dust shield (22); a head portion (38') of said fastener (38) engaging said end surface (44) of the tab (42) to produce flattening distortion of said tab (42) when said fastener (38) is tightened and its head portion (38') moved toward the housing 14, thereby flattening said tab (42) into the plane of the dust shield (22) rotates said dust shield to cause said remote surface of the dust shield to press against the housing.

3. In combination: an assembly system for rigidly attaching a dust shield to a transmission's clutch/torque converter housing (14) along only substantially one edge portion of the dust shield, comprising: a dust shield (22) having a surface (28) remote from said one edge portion and adapted to firmly contact the housing (14) to inhibit vibratory movements; a first opening (32) extending through said one edge portion of said dust shield (22); a first fastener (30) with a cylindrical body portion adapted to extend through said first opening (32) and be threadably received by said housing (14); a second opening (40) extending through said one edge portion of said dust shield (22); a second fastener (38) with a cylindrical body portion adapted to extend through said opening (40) and threading into the housing (14); a tab (42) having an end (44) forming a portion of the side of said second opening (40) through said dust shield, said end (44) of said tab (42) being offset outwardly from the plane of said dust shield (22) and away from the housing (14) when in an unstressed condition and capable of movement into the plane of said dust shield (22); said second fastener having a head portion (38') which engages said end (44) of said offset tab (42) to cause said tab (42) to be distorted into the plane of said dust shield (22) when said second fastener (38) is tightened to move its head portion (38') toward the housing (14), whereby movement of said tab (42) into the plane of said dust shield (22) causes said dust shield (22) to rotate about said first fastener and to move said remote edge portion (28) of said dust shield (22) tightly against the housing (14).

* * * * *